United States Patent
Xu (10) Patent No.: US 12,075,101 B2
(45) Date of Patent: Aug. 27, 2024

(54) BULLET-SCREEN COMMENT PROCESSING METHOD AND APPARATUS

(71) Applicant: SHANGHAI BILIBILI TECHNOLOGY CO., LTD., Shanghai (CN)

(72) Inventor: Xingwang Xu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/944,088

(22) Filed: Sep. 13, 2022

(65) Prior Publication Data

US 2023/0105417 A1  Apr. 6, 2023

(30) Foreign Application Priority Data

Sep. 17, 2021 (CN) .......................... 202111094966.2

(51) Int. Cl.
*H04N 21/238* (2011.01)
*H04N 21/262* (2011.01)

(52) U.S. Cl.
CPC ......... *H04N 21/238* (2013.01); *H04N 21/262* (2013.01)

(58) Field of Classification Search
CPC ........................... H04N 21/238; H04N 21/262

USPC .......................................................... 725/86
See application file for complete search history.

(56) References Cited

U.S. PATENT DOCUMENTS

| 2015/0142888 A1* | 5/2015 | Browning ............... G06F 40/30 709/204 |
| 2017/0368454 A1* | 12/2017 | Sivak ...................... A63F 13/35 |
| 2021/0120319 A1* | 4/2021 | Zhou ................ H04N 21/43074 |

* cited by examiner

*Primary Examiner* — Nnenna N Ekpo
(74) *Attorney, Agent, or Firm* — BakerHostetler (57) ABSTRACT

This application provides techniques of processing bullet screens for a target user group. The techniques comprises receiving an instruction of creating a target user group associated with watching a target video, wherein the instruction comprises information indicative of the target video; creating the target user group in response to receiving the instruction, wherein the target user group comprises a plurality of users, and wherein the target user group corresponds to a user group identifier; generating a user group comment pool corresponding to the target user group, the user group comment pool configured to store information sent from any user in the target user group; determining a target client computing device associated with one of the plurality of users in the target user group; and sending the target video to the target client computing device for playing the target video on the target client computing device.

20 Claims, 6 Drawing Sheets

BULLET-SCREEN COMMENT PROCESSING METHOD AND APPARATUS

CROSS-REFERENCE TO RELATED APPLICATIONS

This application claims priority to Chinese Patent Application No. 202111094966.2, filed with the China National Intellectual Property Administration on Sep. 17, 2021, and entitled "BULLET-SCREEN COMMENT PROCESSING METHOD AND APPARATUS", which is incorporated herein by reference in its entirety.

BACKGROUND

Users may attempt to access conventional social media on their devices to communicate about interesting content. Using conventional social media may be cumbersome as users may have to switch back and forth between different applications to access the content of interest and social media related to the content. As communication devices, such as mobile phones, become more sophisticated, people continue to discover new ways to communicate.

SUMMARY

In view of this, embodiments of this application provide a bullet-screen comment processing method. This application also relates to a bullet-screen comment processing apparatus, a computing device, and a computer-readable storage medium, to resolve a conventional technology problem that a video viewing manner is single and lacks atmosphere.

According to a first aspect of the embodiments of this application, a bullet-screen comment processing method is provided and is applied to a server, including:
  receiving a user group creation instruction for a target video;
  creating a target user group in response to the user group creation instruction, where the target user group includes at least one user;
  determining, based on the target user group, a target client corresponding to the target video, and sending the target video to the target client;
  obtaining user group bullet-screen comment information sent by a target user in the target user group for the target user group; and
  sending the user group bullet-screen comment information to the target client.

According to a second aspect of the embodiments of this application, a bullet-screen comment processing method is provided and is applied to a client, including:
  generating a user group creation instruction for a target video, and sending the user group creation instruction to a server, to enable the server to create a target user group for the target video based on the user group creation instruction;
  receiving the target video sent by the server, and playing the target video; and
  receiving and displaying user group bullet-screen comment information sent by the server, where the user group bullet-screen comment information is sent by a target user in the target user group for the target user group.

According to a third aspect of the embodiments of this application, a bullet-screen comment processing apparatus is provided and applied to a server, including:
  a receiving module, configured to receive a user group creation instruction for a target video;
  a creation module, configured to create a target user group in response to the user group creation instruction, where the target user group includes at least one user;
  a determining module, configured to determine, based on the target user group, a target client corresponding to the target video, and send the target video to the target client;
  an obtaining module, configured to obtain user group bullet-screen comment information sent by a target user in the target user group for the target user group; and
  a sending module, configured to send the user group bullet-screen comment information to the target client.

According to a fourth aspect of the embodiments of this application, a bullet-screen comment processing apparatus is provided and applied to a client, including:
  a generation module, configured to generate a user group creation instruction for a target video, and send the user group creation instruction to a server, to enable the server to create a target user group for the target video based on the user group creation instruction;
  a playback module, configured to receive the target video sent by the server, and play the target video; and
  a display module, configured to receive and display user group bullet-screen comment information sent by the server, where the user group bullet-screen comment information is sent by a target user in the target user group for the target user group.

According to a fifth aspect of the embodiments of this application, a computing device is provided, including a memory, a processor, and computer instructions stored in the memory and capable of running on the processor. The processor implements the steps of the bullet-screen comment processing method when executing the computer instructions.

According to a sixth aspect of the embodiments of this application, a computer-readable storage medium is provided, where the computer-readable storage medium stores computer instructions. When the computer instructions are executed by a processor, the steps of the bullet-screen comment processing method are implemented.

The bullet-screen comment processing method provided in this application includes: receiving a user group creation instruction for a target video; creating a target user group in response to the user group creation instruction, where the target user group includes at least one user; determining, based on the target user group, a target client corresponding to the target video, and sending the target video to the target client; obtaining user group bullet-screen comment information sent by a target user in the target user group for the target user group; and sending the user group bullet-screen comment information to the target client.

The embodiments of this application implement that multiple users watch a same video in a same user group, and the users in the user group can communicate with each other by using bullet-screen comments. This improves video viewing experience. The bullet-screen comment is used to replace an independent chat module, to display communication between the users in the user group. This adds a video viewing area and enriches bullet-screen comment display forms.

DESCRIPTION OF EMBODIMENTS

Many specific details are described in the following descriptions to facilitate full understanding of this application. However, this application can be implemented in many different manners from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a" and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to differentiate between information of the same type. For example, without departing from the scope of one or more embodiments of this application, "first" may also be referred to as "second", and similarly, "second" may also be referred to as "first". Depending on the context, for example, the word "if" used herein can be explained as "while", "when", or "in response to determining".

With continuous increase of video display forms, users have higher requirements for fun and atmosphere during watching videos. There is a video display form that multiple users watch a same video in a same virtual room. To facilitate communication between the users in the virtual room, a communication module is added to the virtual room. However, the added communication module occupies a viewing area for the users to watch the video, which affects the user's viewing experience.

This disclosure provides techniques for processing bullet screens. A bullet screen may be generated based on comments/information sent from a user or information collected from any data resource. A bullet screen may be displayed in an overlay above a video. For example, a bullet screen may be shown moving across video frames, such as scrolling (e.g., from right to left, left to right, top to bottom, bottom to top) across one or more video frames. This disclosure also relates to a bullet screen comment processing apparatus, a computing device, and a computer-readable storage medium. The bullet-screen comment processing method, the bullet-screen comment processing apparatus, the computing device, and the computer-readable storage medium are described in detail one by one in the following embodiments.

Figure 1:
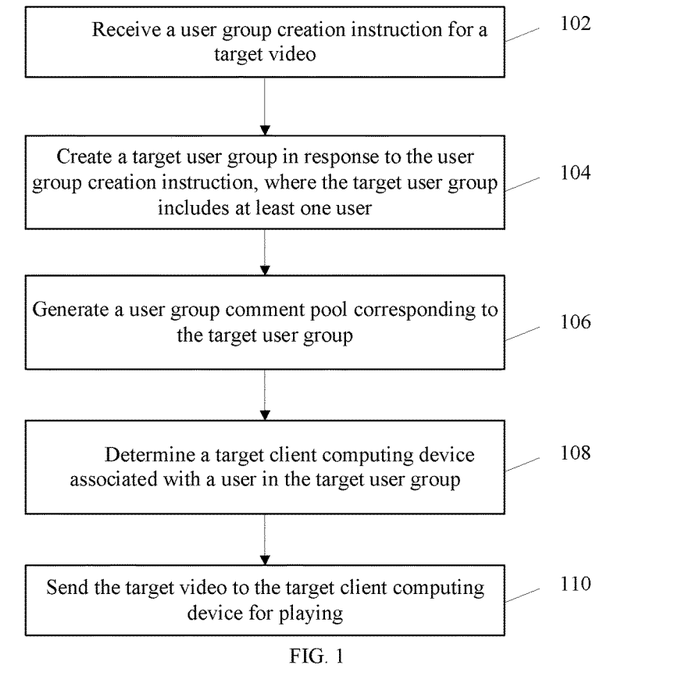
FIG. 1 is a flowchart of a first bullet-screen comment processing method according to an embodiment of this application.

FIG. 1 is a flowchart of a first bullet screen comment processing method according to an embodiment of this application. The method is applied to a server, and specifically includes the following steps.

At 102: Receive an instruction of creating a target user group associated with watching a target video, wherein the instruction comprises information indicative of the target video. The target video may be a video that a user selects from a video platform and wants to watch. For example, the target video is a movie video selected by the user. Users in a user group have same selection information and/or same attribute information.

The users in the user group may have same selection information. For example, the user group may include users at a same geographical location, for example, users at a restaurant or users at a square. The user group may alternatively be based on hobbies and interests of users, for example, a user group includes users who like to watch a same type of video (for example, a military-themed video, a financial-themed video, or a sports event). The user group may alternatively be based on viewing times selected by users, for example, a user group includes users watching a video from eight o'clock to ten o'clock in the morning. The user group may alternatively be a virtual room including users who want to watch a same video. The user group may alternatively include users who sit in a seat in a virtual room at different time periods, for example, users who sit in a seat in a row of a virtual room A at different time periods. It should be noted that the virtual room in this application is different from a live streaming room that may be established only by a streamer of the live streaming room. The virtual room may be established by a user who watches the target video. The user who wants to watch the target video may enter a same virtual room to watch the target video synchronously.

The users in the user group may have same attribute information. For example, the user group may be based on age information of users. For example, users in an age group of 21 to 30 are regarded as one user group, and users in an age group of 31 to 40 are regarded as another user group. The user group may alternatively be based on gender information of users. For example, male audiences are in one user group, and female audiences are in one user group. The user group may alternatively be based on occupation information of users. For example, users in the legal industry are in one user group, and users in the service industry are in one user group.

The user group may alternatively be based on a combination of any one of the foregoing at least two pieces of information, which is not limited in this application.

In actual application, there are more and more video display forms, requirements of the user for fun and atmosphere of video viewing accordingly increase. Users who want to watch a same video may form a user group to watch the same video together. Communication between users in the user group brings a viewing atmosphere. This enhances video viewing experience. In the solution of this application, to balance viewing and inter-user communication, inter-user communication is displayed in the user group through bullet-screen comments. This adds a video viewing area, but does not affect communication between the users in the user group.

The user group creation instruction for the target video is an instruction for creating a user group for playing the target video. The user group creation instruction may be a user group creation instruction generated by a client based on a target video selected by the user or based on information such as a user preference and habit.

In a specific embodiment of this application, a virtual room creation instruction A is used as an example, and the server receives the virtual room creation instruction A for the target video.

The server receives a user group creation instruction sent by the client for the target video, so that the server subsequently creates, based on the user group creation instruction, a user group used for playing the target video.

At 104: Create the target user group in response to receiving the user group creation instruction, wherein the target user group includes a plurality of users, and wherein the target user group corresponds to a user group identifier. The target user group is a user set complying with the user group creation instruction. The user group creation instruction includes video information of the target video. The target user group used for playing the target video is created based on the video information. The target video may be played in a created target user group.

In a specific implementation of this application, a same-occupation user group creation instruction is used as an example. The target user group is created in response to the same-occupation user group creation instruction. Users having a same occupation are determined in a user information table, for example, users in the medicine industry are determined, and the users whose occupation is in the medicine industry form a user group.

By creating the target user group and playing the target video in the target user group, it is convenient for users who enter the target user group to watch the target video synchronously.

At 106: Generate a user group comment pool corresponding to the target user group, wherein the user group comment pool is configured to store information sent from any user in the target user group. In embodiments, information may be received from client computing devices associated with users in the target user group, wherein the information carries the user group identifier. The received information may be stored into the user group comment pool based on the user group identifier. At least one user group bullet screen may be generated based on the received information. The at least one user group bullet screen may be sent to a plurality of client computing devices associated with the plurality of users in the target user group for display of the at least one user group bullet screen moving across one or more frames of the target video in a first form.

In examples, a target client computing device associated with a user in the target user group may be determined, as shown at 108. The target video may be sent to the target client computing device for playing the target video on the target client computing device, as shown at 110.

The target client is a client that has a correspondence with the target user group. For example, if a user P is one of the users in the target user group, a client of the user P may be used as the target client. The server creates the target user group based on the user group creation instruction, and plays the target video in the target user group. The user selects a target video that the user wants to watch from multiple videos, and selects a target user group to enter from multiple target user groups in which the target video is played. Therefore, a communication connection between the client and the target user group is established, and the user who enters the target user group can watch the target video in the user group.

Obtain user group bullet-screen comment information sent by a target user in the target user group for the target user group. The user group bullet-screen comment information is bullet-screen comment information generated for the target user group, for example, user group bullet-screen comment information generated based on bullet-screen comment content input by the client for the target user group, or user group bullet-screen comment information generated based on preset bullet-screen comment information and user group information of the user group.

Specifically, obtaining the user group bullet-screen comment information sent by the target user in the target user group for the target user group includes: determining a user group bullet-screen comment pool corresponding to the target user group; and obtaining, from the user group bullet-screen comment pool, the user group bullet-screen comment information sent by the target user in the target user group for the target user group.

The user group bullet-screen comment pool is a database used to store the user group bullet-screen comment information or another container that can store the user group bullet-screen comment information.

In actual application, each user group corresponds to a user group bullet-screen comment pool used to store user group bullet-screen comment information. After the target user group is determined, a user group bullet-screen comment pool of the target user group may be determined. The user group bullet-screen comment pool stores the user group bullet-screen comment information of the target user group, and the user group bullet-screen comment information is obtained from the user group bullet-screen comment pool.

In a specific implementation of this application, that the target user group is a virtual room G is used as an example. A room bullet-screen comment pool g corresponding to the virtual room G is determined, and room bullet-screen comment information of the virtual room G is obtained from the room bullet-screen comment pool g.

The user group bullet-screen comment information is obtained from the user group bullet-screen comment pool, which helps efficiently obtain the user group bullet-screen comment information, and subsequently display the user group bullet-screen comment information.

It should be noted that each target user group has a corresponding user group bullet-screen comment pool thereof. After the target user group is created, the corresponding user group bullet-screen comment pool is generated. When the target user group is disbanded, the user group bullet-screen comment pool of the target user group is deleted.

A specific operation of deleting the user group bullet-screen comment pool includes: when a user group disbandment instruction is received, disbanding the target user group and deleting the user group bullet-screen comment pool.

The user group disbandment instruction is an instruction for disbanding a user group. For example, if all users in a user group quit the user group, the server may automatically issue a user group disbandment instruction. In another example, an administrator of a user group sends a user group disbandment instruction by touching a user group disbandment button.

In a specific implementation of this application, that an administrator A of a user group G clicks a user group disbandment button is used as an example. In response to a user group disbandment instruction generated by clicking the user group disbandment button, the server disbands the user group G, and deletes user group bullet-screen comment pool of the user group G.

In response to the user group disbandment instruction, the user group G is disbanded and the corresponding user group bullet-screen comment pool is also deleted. This helps delete user group bullet-screen comment information with low utilization in time, thereby saving storage space.

In actual application, before the user group bullet-screen comment information sent by the target user in the target user group for the target user group is obtained, the method further includes: receiving the user group bullet-screen comment information sent by the target user in the target user group for the target user group; and storing the user group bullet-screen comment information into the user group bullet-screen comment pool.

Specifically, the user group bullet-screen comment information sent by the target user in the target user group for the target user group is received. For example, a user D in the target user group sends bullet-screen comment information for the target user group in which the user D is located. The target user group corresponds to a user group bullet-screen comment pool, and the received user group bullet-screen comment information is stored in the user group bullet-screen comment pool.

In a specific implementation of this application, a user group bullet-screen comment pool h is used as an example. A user group bullet-screen comment pool of a user group H is the user group bullet-screen comment pool h, and a user group identifier "H" identifies the user group H. User group bullet-screen comment information 1, 2, . . . , and n that carry the user group identifier "H" are received, and the user group bullet-screen comment information 1, 2, . . . , and n are stored in the user group bullet-screen comment pool h corresponding to the user group H.

The user group bullet-screen comment information carrying the user group identifier is stored in the user group bullet-screen comment pool. This helps subsequently obtain the user group bullet-screen comment information corresponding to the user group, thereby improving obtaining efficiency.

In actual application, the operation of receiving the user group bullet-screen comment information sent by the target user in the target user group for the target user group specifically includes: receiving dialog bullet-screen comment information that is sent by the target client and carries a user group identifier.

The dialog bullet-screen comment information is bullet-screen comment information entered by the user in the target user group by using the client. The dialog bullet-screen comment information carries the user group identifier, and is used to indicate the target user group to which the dialog bullet-screen comment information is sent. The dialog bullet-screen comment information sent for the target user group may be saved as the user group bullet-screen comment information into the user group bullet-screen comment pool of the target user group. The server may forward the received dialog bullet-screen comment information to a target client corresponding to each user in the target user group, to implement interaction between the users in the target user group.

In a specific implementation of this application, dialog bullet-screen comment information "welcome" is used as an example. The dialog bullet-screen comment information "welcome" that carries a user group identifier and that is generated for user group bullet-screen comment content of a user group is input to a client. The server receives the dialog bullet-screen comment information "welcome" that carries the user group identifier and that is sent by the client, and stores the dialog bullet-screen comment information "welcome" in a user group bullet-screen comment pool corresponding to the user group identifier.

The dialog bullet-screen comment information sent by the client for the target user group is received, which helps implement interaction between the users in the target user group and improve user participation. Send the user group bullet-screen comment information to the target client. Specifically, the user group bullet-screen comment information is sent to the target client corresponding to the user in the target user group, so that the client can display the user group bullet-screen comment information.

In actual application, in addition to receiving the dialog bullet-screen comment information sent by the client, prompt bullet-screen comment information generated by the server based on the user group may be also received. Steps of obtaining the prompt bullet-screen comment information specifically include: obtaining preset bullet-screen comment information and user group information of the target user group; generating the prompt bullet-screen comment information based on the preset bullet-screen comment information and/or the user group information; and sending the prompt bullet-screen comment information to the target client.

The preset bullet-screen comment information is bullet-screen comment information sent by the user group based on user group bullet-screen comment information preset by the user group, such as "welcome *** to the room". The user group information of the target user group includes but is not limited to information related to the user group, such as information about a user connection status in the user group and information about a video playback status in the user group.

The prompt bullet-screen comment information is bullet-screen comment information generated based on the preset bullet-screen comment information and/or the user group information. The prompt bullet-screen comment information may be a key prompt bullet-screen comment, for example, a small speaker, a message prompt bullet-screen comment for a gift, and the like. For example, when the user group information is that a user A enters the target user group, and the preset bullet-screen comment information is "welcome *** to the room", the server may generate the prompt bullet-screen comment information as "welcome the user A to the room". In another example, preset bullet-screen comment information "the show is about to end" may be used as the prompt bullet-screen comment information. The generated prompt bullet-screen comment information may be sent to the target client corresponding to the user in the target user group, so that the target client can display the prompt bullet-screen comment.

In a specific implementation of this application, for example, user group information of a user group D is that a user B gives a fireworks gift. Preset bullet-screen comment information "*** gives fireworks" and user group information "the user B gives the fireworks gift" are obtained, and prompt bullet-screen comment information "the user B gives fireworks" is generated based on the preset bullet-screen comment information and the user group information. The prompt bullet-screen comment information is sent to a target client corresponding to each user in the user group D. For example, the prompt bullet-screen comment information is sent to a client of the user B.

In actual application, the prompt bullet-screen comment information may further include an interactive component, for example, a button that is configured to interact with the user, which helps implement interaction between the prompt bullet-screen comment information and the user in the target user group.

Specifically, the prompt bullet-screen comment information may be prompt bullet-screen comment information carrying the interactive component, that is, the prompt bullet-screen comment information includes the interactive component. The interactive component is used by a user to interact with the user in the target user group. For example, a bullet-screen comment carrying a ticket selling button is provided, and the user in the user group may virtually buy a ticket and select a seat by using the ticket selling button carried in the bullet-screen comment.

The interactive component refers to a functional control that implements interaction between the prompt bullet-screen comment information and the user, for example, a button, a text box, and another component that may be displayed in the prompt bullet-screen comment information.

Specifically, the prompt bullet-screen comment information carrying the interactive component is obtained, and the prompt bullet-screen comment information carrying the interactive component is sent to the target client, so that the target client can display user group bullet-screen comment information that enables interaction with the user.

In a specific implementation of this application, prompt bullet-screen comment information including a seat selection button A is used as an example. The prompt bullet-screen comment information is obtained. The prompt bullet-screen comment information includes an interactive component, that is, includes the seat selection button A. By touching the seat selection button A, the user may select a seat in the user group. The bullet-screen comment information including the seat selection button A is the prompt bullet-screen comment information, and the prompt bullet-screen comment information is sent to the target client as the user group bullet-screen comment information.

The interactive component is added to the prompt bullet-screen comment information. This helps implement interaction between the user and the prompt bullet-screen comment information, and improve user experience.

In actual application, before the user group bullet-screen comment information is sent to the target client, the user group bullet-screen comment information may be further reviewed, to check whether the user group bullet-screen comment information complies with a platform rule, laws and regulations, or the like.

Specifically, sending the user group bullet-screen comment information to the target client includes: reviewing the user group bullet-screen comment information according to a user group bullet-screen comment review rule; and sending reviewed user group bullet-screen comment information to the target client.

The user group bullet-screen comment review rule is a rule for reviewing the user group bullet-screen comment. Because the user group bullet-screen comment needs to be displayed only in the user group, the user group bullet-screen comment review rule may be different from a common video bullet-screen comment review rule. That is, the user group bullet-screen comment can be displayed only if the user group bullet-screen comment information complies with the user group bullet-screen comment review rule. Review refers to querying whether content of the user group bullet-screen comment information complies with the platform rule, other laws and regulations, or the like.

The reviewed user group bullet-screen comment information is sent to the client, which helps display, on the client corresponding to the user group, user group bullet-screen comment content complying with the rule.

In actual application, the user group may simultaneously display the user group bullet-screen comment information for the user group and video bullet-screen comment information for the target video played in the user group.

A method for obtaining video bullet-screen comment information of the target video specifically includes: determining a video bullet-screen comment pool corresponding to the target video; and obtaining video bullet-screen comment information from the video bullet-screen comment pool, and sending the video bullet-screen comment information to the target client.

The video bullet-screen comment pool is a database used to store the video bullet-screen comment information or another container that has a storage function. Specifically, a video bullet-screen comment pool of a determined target video is determined based on the determined target video, and video bullet-screen comment information of the target video is obtained from a determined video bullet-screen comment pool. This helps subsequently display the video bullet-screen comment information on the target client.

In actual application, before the sending the video bullet-screen comment information to the target client, the bullet-screen comment may be reviewed. A specific method includes: reviewing the video bullet-screen comment information according to a video bullet-screen comment review rule; and sending reviewed video bullet-screen comment information to the target client.

The video bullet-screen comment review rule is a rule for reviewing a bullet-screen comment for the target video. An obtained video bullet-screen comment for the target video is reviewed, and a reviewed video bullet-screen comment is sent to the client and displayed by the client.

In actual application, the user group bullet-screen comment information is displayed only in the user group, and resource consumption due to a display frequency, a supported feature, and the like during display may reduce. Therefore, an upper limit of stored bullet-screen comment information is relaxed. In this case, bullet-screen comment information including content that occupies large memory, such as a picture may be sent. Therefore, the user group bullet-screen comment information can include at least one type of multimedia information.

The multimedia information includes but is not limited to content information that can be displayed, such as picture information, video information, audio information, and text information. That the user group bullet-screen comment information includes at least one type of multimedia information means that the user group bullet-screen comment information may include user group bullet-screen comment information including multimedia information such as text and picture information, text and video information. For example, in a specific implementation of this application, the user group bullet-screen comment information includes text information A and picture information B.

The bullet-screen comment processing method in this application includes: receiving a user group creation instruction for a target video; creating a target user group in response to the user group creation instruction, where the target user group includes at least one user; determining, based on the target user group, a target client corresponding to the target video, and sending the target video to the target client; and obtaining user group bullet-screen comment information sent by a target user in the target user group for the target user group. The solution in this application implements that multiple users watch a same video in a same user group, and the users in the user group can communicate with each other by using bullet-screen comments. This improves video viewing experience.

Figure 2:
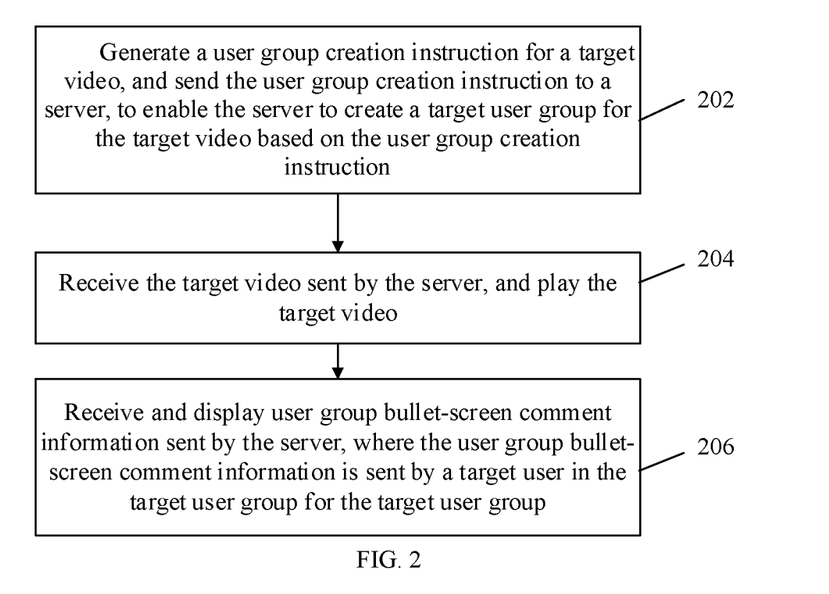
FIG. 2 is a flowchart of a second bullet-screen comment processing method according to another embodiment of this application.

FIG. 2 is a flowchart of a second bullet-screen comment processing method according to an embodiment of this application. The method is applied to a client, and specifically includes the following steps.

Step 202: Generate a user group creation instruction for a target video, and send the user group creation instruction to a server, to enable the server to create a target user group for the target video based on the user group creation instruction.

Specifically, the client generates the user group creation instruction for the target video based on information such as a requirement or a user attribute. For example, based on a user viewing preference, users who often watches a same type of TV series are used to form a user group. The generated user group creation instruction is forwarded to the server, to enable the server to create the target user group for the target video based on the user group creation instruction.

In a specific implementation of this application, a user group creation instruction X is used as an example. The client generates the user group creation instruction, and forwards the user group creation instruction X to the server, to enable the server to create the target user group for the target video.

The user group creation instruction is generated and forwarded to the server. This helps subsequently establish a communication connection between the user group and the client, and enables data transmission between the user group and a corresponding target client to be smoother.

Step 204: Receive the target video sent by the server, and play the target video.

Specifically, after determining the target video to be played by the target user group on the target client, the server sends the target video to the target client. The target client receives the target video, and displays the target video on the target client.

In a specific implementation of this application, a movie video is used as an example. In response to a movie video sending instruction, the server sends the movie video to the client. The client receives the target video, and displays the target video. Therefore, a connection between the server and the client is established.

By establishing a communication connection between the user group and the client, the target video is sent to the client, which helps improve subsequent transmission efficiency of bullet-screen comment information.

Step 206: Receive and display user group bullet-screen comment information sent by the server, where the user group bullet-screen comment information is sent by a target user in the target user group for the target user group.

Specifically, the client receives the user group bullet-screen comment information sent by the server. The user group bullet-screen comment information is bullet-screen comment information sent by the target user in the target user group for the target user group.

In a specific implementation of this application, a client Q corresponding to a user q is used as an example. A target user group in which the user q is located includes a user m, a user n, and the user q. The user m sends user group bullet-screen comment information for the target user group. The client Q receives the user group bullet-screen comment information, and displays the user group bullet-screen comment information on the client Q.

In actual application, in addition to receiving the user group bullet-screen comment information for display, the client may also receive bullet-screen comment information entered by a user for the target user group, generate user group bullet-screen comment information, and send the user group bullet-screen comment information to the server, to enable the server to send the user group bullet-screen comment information to another client corresponding to the target user group.

In actual application, the user may enter bullet-screen comment content on the client, and the client generates bullet-screen comment information based on the entered bullet-screen comment content, and sends the generated bullet-screen comment information to the server. A specific method includes the following steps:

receiving dialog bullet-screen comment information entered by the user, where the dialog bullet-screen comment information includes at least one type of multimedia information;

generating, based on a user group identifier of the target user group and the dialog bullet-screen comment information, dialog bullet-screen comment information carrying the user group identifier; and sending the dialog bullet-screen comment information carrying the user group identifier to the server.

The at least one type of multimedia information refers to that the dialog bullet-screen comment information may include one or more types of multimedia information. For example, the dialog bullet-screen comment information may include picture and text information. The dialog bullet-screen comment information refers to the bullet-screen comment information generated based on the bullet-screen comment content entered by the user in the user group. The user group identifier is a character that can uniquely identify a user group.

In a specific implementation of this application, a client J is used as an example. The client J generates dialog bullet-screen comment information of a target user group based on text information "hello" and picture information A that are entered by a user; generates, based on the dialog bullet-screen comment information and a user group identifier of the target user group in which the client J is located, dialog bullet-screen comment information carrying the user group identifier; and sends the dialog bullet-screen comment information carrying the user group identifier to the server.

The dialog bullet-screen comment information is generated based on bullet-screen comment content of one or more types of multimedia information entered by the user. In addition, a user group label of the target user group is added. This improves fun of communication between users in the user group.

In actual application, in the user group, not only the user group bullet-screen comment information may be displayed, but also video bullet-screen comment information of a target video played in the user group may be displayed.

To distinguish between the two types of bullet-screen comments, different display forms may be used to display the two types of bullet-screen comments. A specific display method includes the following steps:

receiving video bullet-screen comment information sent by the server; and displaying the user group bullet-screen comment information in a first bullet-screen comment form, and displaying the video bullet-screen comment information in a second bullet-screen comment form.

The first bullet-screen comment form is a form of displaying the bullet-screen comment information in a preset manner. The second bullet-screen comment form is a form of displaying the bullet-screen comment information in a preset manner different from the first bullet-screen comment form. For example, the two forms of bullet-screen comments may be distinguished in a display style, a font, a color, and the like, so that the user directly identifies which are the user group bullet-screen comment information and which are the video bullet-screen comment information. The bullet-screen comment forms are not specifically limited herein, provided that the first bullet-screen comment form is disposed to be different from the second bullet-screen comment form.

It should be noted that the user in the user group can send the user group bullet-screen comment information or the video bullet-screen comment information by using an additional provided button. For example, a user group bullet-screen comment button and a video bullet-screen comment button are provided on a right side of a bullet-screen comment content input box in a user group A. If the user clicks the user group bullet-screen comment button to send a bullet-screen comment, the bullet-screen comment sent by the user is user group bullet-screen comment information. If the user clicks the video bullet-screen comment button to send a bullet-screen comment, the bullet-screen comment sent by the user is video bullet-screen comment information.

In a specific implementation of this application, that the user group bullet-screen comment information is A and the video bullet-screen comment information is B is used as an example. The video bullet-screen comment information B and the user group bullet-screen comment information A are received. Content of the user group bullet-screen comment information A is displayed in a red font, and the video bullet-screen comment information B is displayed in a white font.

The user group bullet-screen comment information and the video bullet-screen comment information are displayed in different forms, which enriches bullet-screen comment display forms, and helps the user to identify different types of bullet-screen comments.

In actual application, in addition to receiving the user group bullet-screen comment information, the client may further receive prompt bullet-screen comment information generated by the server. The prompt bullet-screen comment information may include an interactive component. Receiving the prompt bullet-screen comment information including the interactive component specifically includes:
  receiving the prompt bullet-screen comment information sent by the server, where the prompt bullet-screen comment information includes the interactive component;
  sending an interactive instruction by using the interactive component; and
  receiving and displaying user group bullet-screen comment information returned by the server based on the interactive instruction.

The interactive component refers to a functional control that can implement interaction with the user, for example, a button disposed in the user group bullet-screen comment information. The interactive instruction is an instruction generated by triggering the interactive component. The interactive instruction is sent to the server, and the server determines corresponding user group bullet-screen comment information based on the interactive instruction, and returns the user group bullet-screen comment information. The client receives the user group bullet-screen comment information returned by the server.

In a specific implementation of this application, that the interactive component is a text box S is used as an example.

An interactive instruction of the prompt bullet-screen comment information is generated for text entered by the user in the text box S. The interactive instruction is sent to the server. The server determines, based on the interactive instruction, the user group bullet-screen comment information corresponding to the interaction information, and returns the user group bullet-screen comment information to the client corresponding to the user group.

In another specific embodiment of this application, that the interactive component is a seating button is used as an example. An interactive instruction of the prompt bullet-screen comment information is generated for clicking the seating button by the user. A user A clicks a seating button of number 7 in row 3, to generate an interactive instruction, and the seating interactive instruction of number 7 in row 3 is sent to the server. The server receives the interactive instruction, and determines user group bullet-screen comment information "the user A is seated in number 7, row 3" corresponding to the interactive instruction. The client receives and displays the user group bullet-screen comment information "the user A is seated in number 7, row 3".

In actual application, user group information of the user group may be adjusted based on the prompt bullet-screen comment information, specifically including:
  when the prompt bullet-screen comment information carries an adjustment instruction of the user group information, adjusting the user group information based on the adjustment instruction of the user group information.

The adjustment instruction of the user group information is an instruction for adjusting current user group information of a user group.

In a specific implementation of this application, that the user group bullet-screen comment information includes adjustment of video brightness displayed by the user group is used as an example. The client displays user group bullet-screen comment information "the movie is about to start, and the light is to be turned off", and adjusts current screen brightness in the user group from 70% to 50% based on an instruction of adjusting the screen brightness to 50% that is carried in the user group bullet-screen comment information.

The user group bullet-screen comment information carrying the adjustment instruction of the user group information is notified to the user before the user group information of the user group is adjusted, which enhances user experience.

This application includes the following steps: generate a user group creation instruction for a target video, and send the user group creation instruction to a server, to enable the server to create a target user group for the target video based on the user group creation instruction; receive the target video sent by the server, and play the target video; and receive and display user group bullet-screen comment information sent by the server, where the user group bullet-screen comment information is sent by a target user in the target user group for the target user group. The solution of this application implements that multiple users watch a same video in a same user group, and the users in the user group can communicate with each other by using bullet-screen comments. This improves video viewing experience. The bullet-screen comment is used to replace an independent chat module, to display communication between the users in the user group. This adds a video viewing area and enriches bullet-screen comment display forms.

Figure 3:
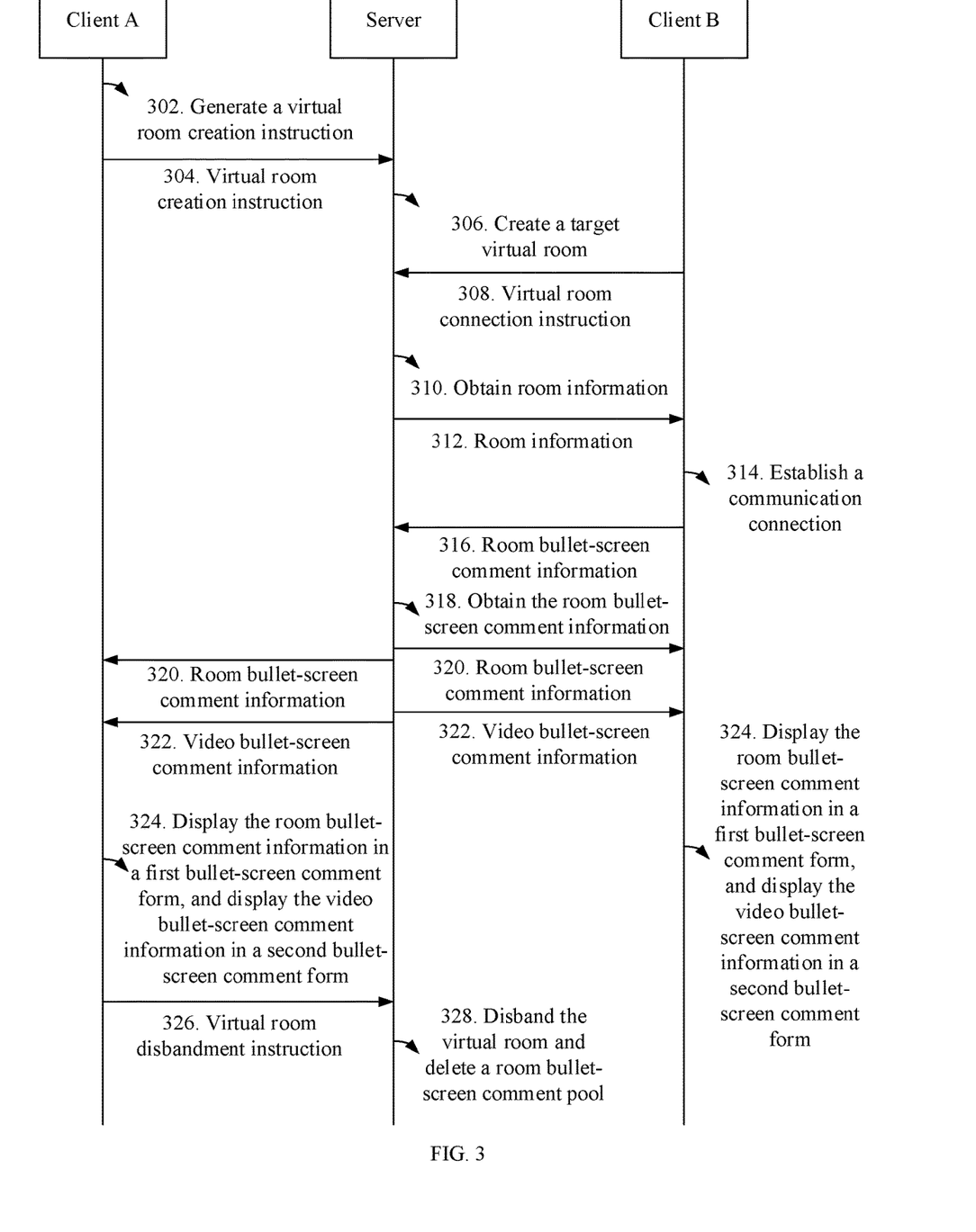
FIG. 3 is a processing flowchart of a bullet-screen comment processing method applied to a virtual room V according to an embodiment of this application.

With reference to FIG. 3, the following further describes the bullet-screen comment processing method by using an example in which the bullet-screen comment processing method provided in this application is applied to a virtual room V. FIG. 3 is a processing flowchart of a bullet-screen comment processing method applied to a virtual room V according to an embodiment of this application. The method specifically includes the following steps:

Step 302: A client A generates a virtual room creation instruction for a target video.

In a specific implementation of this application, that a user group is the virtual room V is used as an example. A user 1 using the client A wants to watch a video a together with another user. The user 1 clicks a virtual room creation button for the video a, to generate a virtual room creation instruction, where the instruction is an instruction used to create the virtual room V.

Step 304: The client A forwards the virtual room creation instruction to a server.

In a specific implementation of this application, in the above example, the client A forwards the virtual room creation instruction to the server.

Step 306: The server receives the virtual room creation instruction, creates a target virtual room, and plays the target video in the target virtual room.

In a specific implementation of this application, in the above example, the server receives the virtual room creation instruction, creates the virtual room V, and plays the video a in the virtual room V.

Step 308: A client B sends a virtual room connection instruction to the server.

In a specific implementation of this application, in the above example, a user 2 using the client B wants to watch the video a in the virtual room V. The virtual room connection instruction is generated when the user 2 selects the virtual room V, and sent to the server.

Step 310: The server receives the virtual room connection instruction, and obtains room information of the target virtual room.

In a specific implementation of this application, in the above example, the server receives the virtual room connection instruction, and determines, based on a virtual room identifier, the client used by the user 2 as a target client, to obtain the room information of the virtual room V.

Step 312: Send the room information to the client B.

In a specific implementation of this application, in the above example, the room information of the virtual room V is sent to the client B used by the user 2, to establish a communication connection with the client B.

Step 314: The client B establishes a communication connection to the target virtual room based on the room information returned by the server in response to the virtual room connection instruction.

In a specific implementation of this application, in the above example, the server establishes a communication connection between the client B and the virtual room V in response to the room information of the virtual room V returned by the virtual room connection instruction.

Step 316: The client B sends room bullet-screen comment information to the server.

In a specific implementation of this application, in the above example, the user 2 using the client B enters, in a bullet-screen comment box, bullet-screen comment content for the virtual room V. The room bullet-screen comment information is sent to the server based on the bullet-screen comment content entered by the user 2.

Step 318: The server determines a room bullet-screen comment pool corresponding to the target virtual room, and obtains the room bullet-screen comment information from the room bullet-screen comment pool.

In a specific implementation of this application, in the above example, the server determines a room bullet-screen comment pool corresponding to the virtual room V, and obtains room bullet-screen comment information for the virtual room V from the room bullet-screen comment pool.

Step 320: The server sends the room bullet-screen comment information to the client.

In a specific implementation of this application, in the above example, the room bullet-screen comment information for the virtual room V is sent to the client A and the client B.

Step 322: The server sends video bullet-screen comment information to the client.

In a specific implementation of this application, in the above example, a video bullet-screen comment pool of the video a is determined. The video bullet-screen comment information is obtained from the video bullet-screen comment pool, and sent to the client A and the client B.

Step 324: Display the room bullet-screen comment information in a first bullet-screen comment form, and display the video bullet-screen comment information in a second bullet-screen comment form.

In a specific implementation of this application, in the above example, the client A and the client B display the room bullet-screen comment information in a bullet-screen comment form of black text, and display the video bullet-screen comment information in a bullet-screen comment form of white text.

Step 326: The server receives a virtual room disbandment instruction.

In a specific implementation of this application, in the above example, the user 1 triggers a room disbandment button for disbanding the virtual room V, to generate the virtual room disbandment instruction.

Step 328: The server disbands the virtual room, and deletes the room bullet-screen comment pool corresponding to the virtual room.

In a specific implementation of this application, in the above example, when the server receives the virtual room disbandment instruction, the server disbands the virtual room V and deletes the room bullet-screen comment pool corresponding to the virtual room V.

According to the bullet-screen comment processing method in this application, the virtual room creation instruction for the target video is received. The target virtual room is created in response to the virtual room creation instruction, and the target video is played in the target virtual room. The target client corresponding to the target virtual room is determined based on the received virtual room connection instruction. The room bullet-screen comment information for the target virtual room is obtained. The room bullet-screen comment information is sent to the target client. This implements that multiple users watch a same video in a same virtual room, and the users in the virtual room can communicate with each other by using bullet-screen comments, thereby improving video viewing experience.

Figure 4:
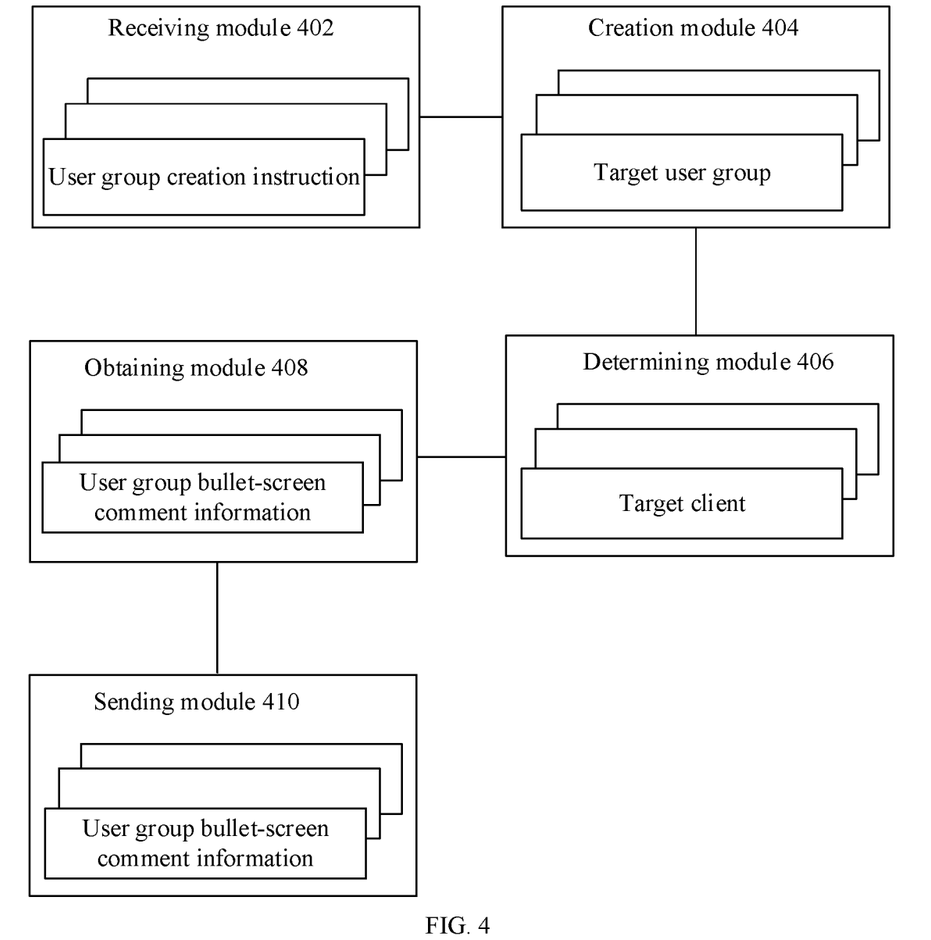
FIG. 4 is a schematic diagram of a structure of a first bullet-screen comment processing apparatus according to an embodiment of this application.

Corresponding to the foregoing method embodiments, this application further provides an embodiment of a bullet-screen comment processing apparatus, applied to a server. FIG. 4 is a schematic diagram of a structure of a first bullet-screen comment processing apparatus according to an embodiment of this application. As shown in FIG. 4, the apparatus includes:

a receiving module 402, configured to receive a user group creation instruction for a target video;

a creation module 404, configured to create a target user group in response to the user group creation instruction, where the target user group includes at least one user;
a determining module 406, configured to determine, based on the target user group, a target client corresponding to the target video, and send the target video to the target client;
an obtaining module 408, configured to obtain user group bullet-screen comment information sent by a target user in the target user group for the target user group; and
a sending module 410, configured to send the user group bullet-screen comment information to the target client.

In an embodiment of this application, the obtaining module 408 is further configured to: determine a user group bullet-screen comment pool corresponding to the target user group; and obtain, from the user group bullet-screen comment pool, the user group bullet-screen comment information sent by the target user in the target user group for the target user group.

Optionally, the obtaining module 408 is further configured to: receive the user group bullet-screen comment information sent by the target user in the target user group for the target user group; and store the user group bullet-screen comment information into the user group bullet-screen comment pool.

Optionally, the obtaining module 408 is further configured to: receive dialog bullet-screen comment information that is sent by the target client and carries a user group identifier.

The apparatus further includes a prompt bullet-screen comment generation module, configured to: obtain preset bullet-screen comment information and user group information of the target user group; generate prompt bullet-screen comment information based on the preset bullet-screen comment information and/or the user group information; and send the prompt bullet-screen comment information to the target client.

Optionally, the prompt bullet-screen comment generation module is further configured to: enable the prompt bullet-screen comment information to include an interactive component, where the interactive component is used by a user in the target user group to interact with the target user group.

The apparatus further includes a review module, configured to: review the user group bullet-screen comment information according to a user group bullet-screen comment review rule; and send reviewed user group bullet-screen comment information to the target client.

The apparatus further includes a deletion module, configured to: when a user group disbandment instruction is received, disband the target user group and delete the user group bullet-screen comment pool.

The apparatus further includes a video bullet-screen comment obtaining module, configured to: determine a video bullet-screen comment pool corresponding to the target video; and obtain video bullet-screen comment information from the video bullet-screen comment pool, and send the video bullet-screen comment information to the target client.

The apparatus further includes a video bullet-screen comment review module, configured to: review the video bullet-screen comment information according to a video bullet-screen comment review rule; and sending reviewed video bullet-screen comment information to the target client. The user group bullet-screen comment information includes at least one type of multimedia information.

The bullet-screen comment processing apparatus in this application, applied to the server, is configured to: receive a user group creation instruction for a target video; create a target user group in response to the user group creation instruction, where the target user group includes at least one user; determine, based on the target user group, a target client corresponding to the target video, and send the target video to the target client; obtain user group bullet-screen comment information sent by a target user in the target user group for the target user group; and send the user group bullet-screen comment information to the target client. The solution in this application implements that multiple users watch a same video in a same user group, and the users in the user group can communicate with each other by using bullet-screen comments. This improves video viewing experience.

Figure 5:
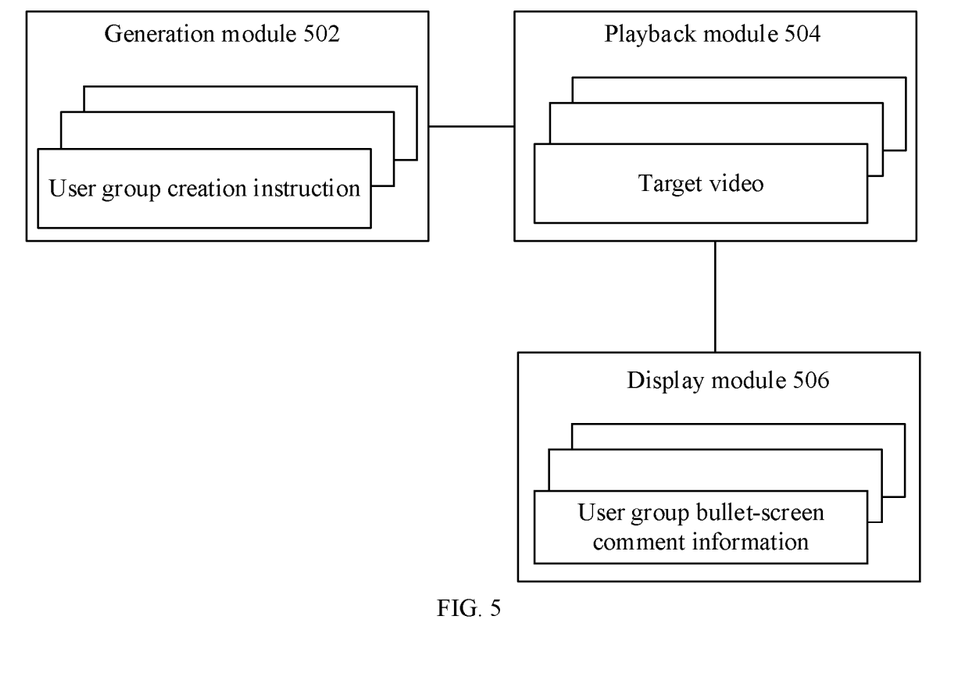
FIG. 5 is a schematic diagram of a structure of a second bullet-screen comment processing apparatus according to an embodiment of this application.

Corresponding to the foregoing method embodiments, this application further provides an embodiment of a bullet-screen comment processing apparatus, applied to a client. FIG. 5 is a schematic diagram of a structure of a second bullet-screen comment processing apparatus according to an embodiment of this application. As shown in FIG. 5, the apparatus includes: a generation module 502, configured to generate a user group creation instruction for a target video, and send the user group creation instruction to a server, to enable the server to create a target user group for the target video based on the user group creation instruction; a playback module 504, configured to receive the target video sent by the server, and play the target video; and a display module 506, configured to receive and display user group bullet-screen comment information sent by the server, where the user group bullet-screen comment information is sent by a target user in the target user group for the target user group.

In a specific embodiment of this application, the bullet-screen comment processing apparatus further includes: a bullet-screen comment generation module, configured to: receive dialog bullet-screen comment information entered by the user, where the dialog bullet-screen comment information includes at least one type of multimedia information; generate, based on a user group identifier of the target user group and the dialog bullet-screen comment information, dialog bullet-screen comment information carrying the user group identifier; and send the dialog bullet-screen comment information carrying the user group identifier to the server.

The bullet-screen comment processing apparatus further includes: a bullet-screen comment information display module, configured to: receive video bullet-screen comment information sent by the server; and display the user group bullet-screen comment information in a first bullet-screen comment form, and display the video bullet-screen comment information in a second bullet-screen comment form.

The bullet-screen comment processing apparatus further includes: an interactive module, configured to: receive prompt bullet-screen comment information sent by the server, where the prompt bullet-screen comment information includes an interactive component; send an interactive instruction by using the interactive component; and receive and display user group bullet-screen comment information returned by the server based on an interactive instruction.

The bullet-screen comment processing apparatus further includes: an adjustment module, configured to: when the prompt bullet-screen comment information carries an adjustment instruction of the user group information, adjust the user group information based on the adjustment instruction of the user group information.

This application provides a bullet-screen comment processing apparatus applied to the client, including: the generation module, configured to generate a user group creation instruction for a target video, and send the user group creation instruction to a server, to enable the server to create a target user group for the target video based on the user group creation instruction; the playback module, configured to receive the target video sent by the server, and play the target video; and the display module, configured to receive and display user group bullet-screen comment information sent by the server, where the user group bullet-screen comment information is sent by a target user in the target user group for the target user group. According to the bullet-screen comment processing apparatus in this application, the bullet-screen comment is used to replace an independent chat module, to display communication between users in the user group. This adds a video viewing area and enriches bullet-screen comment display forms.

The foregoing describes a schematic solution of the bullet-screen comment processing apparatus in the embodiments. It is worthwhile to note that the technical solution of the bullet-screen comment processing apparatus and the technical solution of the foregoing bullet-screen comment processing method belong to the same concept. For details not described in the technical solution of the bullet-screen comment processing apparatus, references can be made to the descriptions of the technical solution of the foregoing bullet-screen comment processing method.

Figure 6:
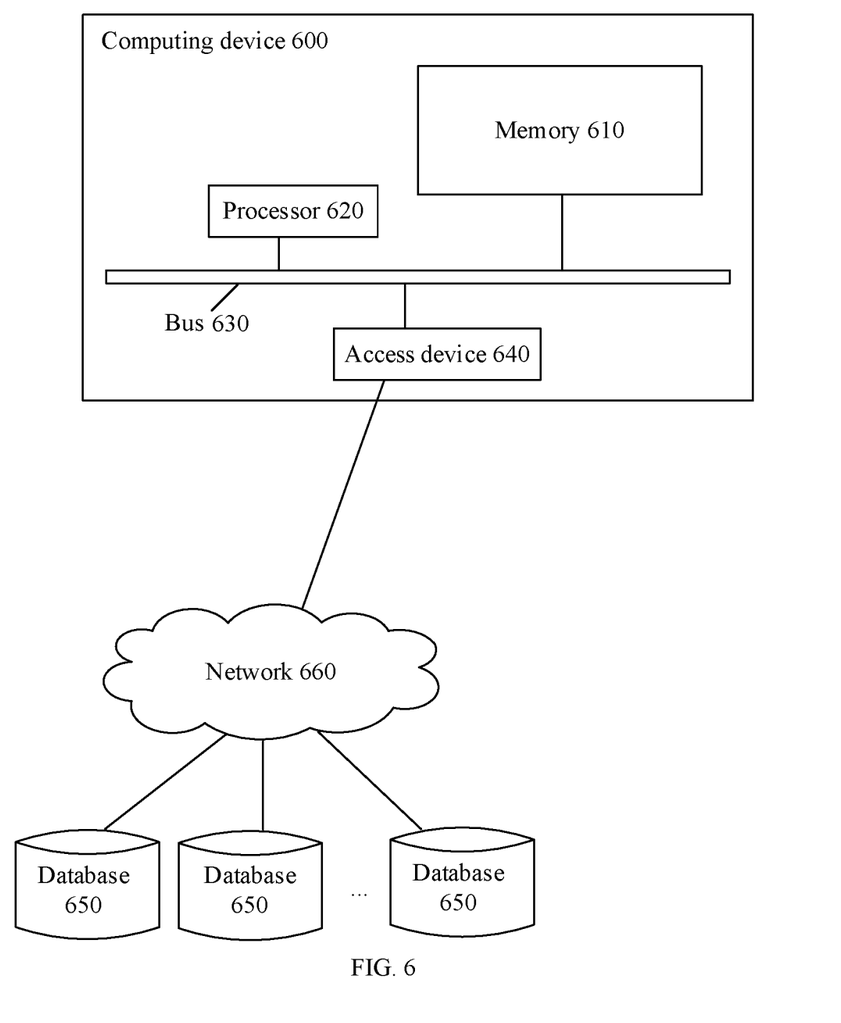
FIG. 6 is a block diagram of a structure of a computing device according to an embodiment of this application.

FIG. 6 is a block diagram of a structure of a computing device 600 according to an embodiment of this application. Components of the computing device 600 include but are not limited to a memory 610 and a processor 620. The processor 620 and the memory 610 are connected by using a bus 630, and a database 650 is configured to store data.

The computing device 600 further includes an access device 640 that enables the computing device 600 to communicate via one or more networks 660. Examples of these networks include a public switched telephone network (PSTN), a local area network (LAN), a wide area network (WAN), a private area network (PAN), or a combination of communications networks such as the Internet. The access device 640 may include one or more of any type of wired or wireless network interface (for example, a network interface card (NIC)), for example, an IEEE 802.11 wireless local area network (WLAN) wireless interface, a Worldwide Interoperability for Microwave Access (WiMAX) interface, an Ethernet interface, a Universal Serial Bus (USB) interface, a cellular network interface, a Bluetooth interface, or a near field communication (NFC) interface.

In an embodiment of this application, the foregoing components of the computing device 600 and other components not shown in FIG. 6 may also be connected to each other, for example, by using the bus. It should be understood that the block diagram of the structure of the computing device shown in FIG. 6 is merely used as an example instead of a limitation on the scope of this application. A person skilled in the art may add or substitute other components as required.

The computing device 600 may be any type of static or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), another type of mobile device, or a static computing device such as a desktop computer or a PC. The computing device 600 may be alternatively a mobile or static server.

The processor 620 implements the steps of the bullet-screen comment processing method when executing computer instructions.

The foregoing describes a schematic solution of a computing device in the embodiments. It is worthwhile to note that the technical solution of the computing device and the technical solution of the foregoing bullet-screen comment processing method belong to the same concept. For details not described in detail in the technical solution of the computing device, references can be made to the descriptions of the technical solution of the foregoing bullet-screen comment processing method.

An embodiment of this application further provides a computer-readable storage medium, where the computer-readable storage medium stores computer instructions. When the computer instructions are executed by a processor, the steps of the bullet-screen comment processing method are implemented.

The foregoing describes a schematic solution of the computer-readable storage medium in the embodiments. It is worthwhile to note that the technical solution of the storage medium and the technical solution of the foregoing bullet-screen comment processing method belong to the same concept. For details not described in detail in the technical solution of the storage medium, references can be made to the descriptions of the technical solution of the foregoing bullet-screen comment processing method.

Specific embodiments of this application are described above. Other embodiments fall within the scope of the appended claims. In some situations, the actions or steps recorded in the claims can be performed in an order different from the order in the embodiments and the desired results can still be achieved. In addition, the process depicted in the accompanying drawings does not necessarily require the shown particular execution order to achieve the desired results. In some implementations, multi-tasking and parallel processing can or may be advantageous.

The computer instructions include computer program code, which may be in a source code form, an object code form, an executable file, an intermediate form, or the like. The computer-readable medium may include: any physical entity or apparatus capable of carrying the computer program code, a recording medium, a USB disk, a mobile hard disk drive, a magnetic disk, an optical disc, a computer memory, a read-only memory (ROM), a random access memory (RAM), an electrical carrier signal, a telecommunications signal, a software distribution medium, and the like. It is worthwhile to note that content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It is worthwhile to note that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the embodiments described in the specification are all preferred embodiments, and involved actions and modules are not necessarily mandatory to this application.

In the foregoing embodiments, descriptions of the embodiments have respective focuses. For a part that is not described in detail in an embodiment, references can be made to related descriptions in another embodiment.

The preferred embodiments of this application disclosed above are merely intended to help describe this application. The optional embodiments do not describe all details, and the present invention is not limited to the specific implementations. Clearly, many modifications and changes may be made based on the content of this application. The embodiments are selected and specifically described in this application to better explain the principle and actual application of this application, so that a person skilled in the art can better understand and use this application. This application is only subjected to the claims and the scope and equivalents thereof.

What is claimed is:

1. A method, comprising:
   receiving an instruction of creating a target user group based on a plurality of users that are watching a target video, wherein the instruction comprises information indicative of the target video;
   creating the target user group in response to receiving the instruction, wherein the target user group comprises the plurality of users, and wherein the target user group corresponds to a user group identifier;
   generating a user group comment pool corresponding to the target user group, the user group comment pool configured to store information sent from any user in the target user group;
   determining a target client computing device associated with one of the plurality of users in the target user group; and
   sending the target video to the target client computing device for playing the target video on the target client computing device.

2. The method of claim 1, further comprising:
   receiving information from the target client computing device or any other client computing device associated with any other user in the target user group, wherein the information carries the user group identifier.

3. The method of claim 2, further comprising:
   storing the information from the target client computing device or the any other client computing device into the user group comment pool based on the user group identifier; and
   sending at least one user group bullet screen generated based on the information from the target client computing device or the any other client computing device to a plurality of client computing devices associated with the plurality of users in the target user group for display of the at least one user group bullet screen moving across one or more frames of the target video in a first form, the plurality of client computing devices comprising the target client computing device and the any other client computing device.

4. The method of claim 1, further comprising:
   obtaining information associated with the target user group, wherein the information associated with the target user group comprises information indicating a status or a behavior of a particular user in the target user group and information indicating a playback status of the target video;
   generating a prompt bullet-screen based on the information associated with the target user group; and
   sending the prompt bullet-screen to a plurality of client computing devices associated with the plurality of users in the target user group for display of the prompt bullet screen moving across one or more frames of the target video in a first form.

5. The method of claim 4, wherein the prompt bullet-screen further comprises an interactive component, the interactive component configured to implement interactions with any user in the target user group.

6. The method of claim 1, further comprising:
   disbanding the target user group and deleting the user group comment pool in response to receiving an instruction of disbanding the target user group.

7. The method of claim 1, further comprising:
   determining a video comment pool corresponding to the target video, the video comment pool configured to store comments on the target video received from any user watching the target video; and
   sending video bullet screens generated based on the comments on the target video to a plurality of client computing devices associated with the plurality of users in the target user group for display of the video bullet screens moving across frames of the target video in a second form.

8. A system, comprising:
   at least one processor; and
   at least one memory communicatively coupled to the at least one processor and comprising computer-readable instructions that upon execution by the at least one processor cause the at least one processor to perform operations comprising:
   receiving an instruction of creating a target user group based on a plurality of users that are watching a target video, wherein the instruction comprises information indicative of the target video;
   creating the target user group in response to receiving the instruction, wherein the target user group comprises the plurality of users, and wherein the target user group corresponds to a user group identifier;
   generating a user group comment pool corresponding to the target user group, the user group comment pool configured to store information sent from any user in the target user group;
   determining a target client computing device associated with one of the plurality of users in the target user group; and
   sending the target video to the target client computing device for playing the target video on the target client computing device.

9. The system of claim 8, the operations further comprising:
   receiving information from the target client computing device or any other client computing device associated with any other user in the target user group, wherein the information carries the user group identifier.

10. The system of claim 9, the operations further comprising:
    storing the information from the target client computing device or the any other client computing device into the user group comment pool based on the user group identifier; and
    sending at least one user group bullet screen generated based on the information from the target client computing device or the any other client computing device to a plurality of client computing devices associated with the plurality of users in the target user group for display of the at least one user group bullet screen moving across one or more frames of the target video in a first form, the plurality of client computing devices comprising the target client computing device and the any other client computing device.

11. The system of claim 8, the operations further comprising:
obtaining information associated with the target user group, wherein the information associated with the target user group comprises information indicating a status or a behavior of a particular user in the target user group and information indicating a playback status of the target video;
generating a prompt bullet-screen based on the information associated with the target user group; and
sending the prompt bullet-screen to a plurality of client computing devices associated with the plurality of users in the target user group for display of the prompt bullet screen moving across one or more frames of the target video in a first form.

12. The system of claim 11, wherein the prompt bullet-screen further comprises an interactive component, the interactive component configured to implement interactions with any user in the target user group.

13. The system of claim 8, the operations further comprising:
disbanding the target user group and deleting the user group comment pool in response to receiving an instruction of disbanding the target user group.

14. The system of claim 8, the operations further comprising:
determining a video comment pool corresponding to the target video, the video comment pool configured to store comments on the target video received from any user watching the target video; and
sending video bullet screens generated based on the comments on the target video to a plurality of client computing devices associated with the plurality of users in the target user group for display of the video bullet screens moving across frames of the target video in a second form.

15. A non-transitory computer-readable storage medium, storing computer-readable instructions that upon execution by a processor cause the processor to implement operations comprising:
receiving an instruction of creating a target user group based on a plurality of users that are watching a target video, wherein the instruction comprises information indicative of the target video;
creating the target user group in response to receiving the instruction, wherein the target user group comprises the plurality of users, and wherein the target user group corresponds to a user group identifier;
generating a user group comment pool corresponding to the target user group, the user group comment pool configured to store information sent from any user in the target user group;
determining a target client computing device associated with one of the plurality of users in the target user group; and
sending the target video to the target client computing device for playing the target video on the target client computing device.

16. The non-transitory computer-readable storage medium of claim 15, the operations further comprising:
receiving information from the target client computing device or any other client computing device associated with any other user in the target user group, wherein the information carries the user group identifier;
storing the information from the target client computing device or the any other client computing device into the user group comment pool based on the user group identifier; and
sending at least one user group bullet screen generated based on the information from the target client computing device or the any other client computing device to a plurality of client computing devices associated with the plurality of users in the target user group for display of the at least one user group bullet screen moving across one or more frames of the target video in a first form, the plurality of client computing devices comprising the target client computing device and the any other client computing device.

17. The non-transitory computer-readable storage medium of claim 15, the operations further comprising:
obtaining information associated with the target user group, wherein the information associated with the target user group comprises information indicating a status or a behavior of a particular user in the target user group and information indicating a playback status of the target video;
generating a prompt bullet-screen based on the information associated with the target user group; and
sending the prompt bullet-screen to a plurality of client computing devices associated with the plurality of users in the target user group for display of the prompt bullet screen moving across one or more frames of the target video in a first form.

18. The non-transitory computer-readable storage medium of claim 17, wherein the prompt bullet-screen further comprises an interactive component, the interactive component configured to implement interactions with any user in the target user group.

19. The non-transitory computer-readable storage medium of claim 15, the operations further comprising:
disbanding the target user group and deleting the user group comment pool in response to receiving an instruction of disbanding the target user group.

20. The non-transitory computer-readable storage medium of claim 15, the operations further comprising:
determining a video comment pool corresponding to the target video, the video comment pool configured to store comments on the target video received from any user watching the target video; and
sending video bullet screens generated based on the comments on the target video to a plurality of client computing devices associated with the plurality of users in the target user group for display of the video bullet screens moving across frames of the target video in a second form.

* * * * *